United States Patent
Tsuchiya (10) Patent No.: US 12,337,795 B2
(45) Date of Patent: Jun. 24, 2025

(54) VEHICLE CONTROL SYSTEM AND CONTROL METHOD OF VEHICLE CONTROL SYSTEM

(71) Applicant: HONDA MOTOR CO., LTD., Tokyo (JP)

(72) Inventor: Yuji Tsuchiya, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 142 days.

(21) Appl. No.: 18/177,183

(22) Filed: Mar. 2, 2023

(65) Prior Publication Data
US 2023/0311811 A1 Oct. 5, 2023

(30) Foreign Application Priority Data
Mar. 30, 2022 (JP) .................. 2022-057411

(51) Int. Cl.
| | | |
|---|---|---|
| B60R 25/31 | (2013.01) | |
| B60R 25/01 | (2013.01) | |
| B60R 25/20 | (2013.01) | |
| B60R 25/25 | (2013.01) | |
| B60R 25/30 | (2013.01) | |

(52) U.S. Cl.
CPC .............. B60R 25/31 (2013.01); B60R 25/01 (2013.01); B60R 25/2045 (2013.01); B60R 25/25 (2013.01); B60R 25/305 (2013.01)

(58) Field of Classification Search
None
See application file for complete search history.

(56) References Cited

U.S. PATENT DOCUMENTS

| | | | |
|---|---|---|---|
| 2020/0180561 A1* | 6/2020 | Lane | G06V 40/103 |
| 2021/0309181 A1* | 10/2021 | Kale | G06V 40/172 |

FOREIGN PATENT DOCUMENTS

JP     2013-28903 A     2/2013

* cited by examiner

*Primary Examiner* — John F Mortell
(74) *Attorney, Agent, or Firm* — Rankin, Hill & Clark LLP (57) ABSTRACT

A control system includes: a vehicle outside image acquisition unit configured to acquire a vehicle outside image; a first detection unit configured to detect a vehicle outside person based on the vehicle outside image acquired by the vehicle outside image acquisition unit; a second detection unit configured to detect an approach mode for the vehicle outside person detected by the first detection unit; a comparison unit configured to compare the approach mode detected by the second detection unit with a reference approach mode; an authentication unit configured to authenticate whether or not the vehicle outside person detected by the first detection unit is a registered user; and a door control unit configured to control a door of the vehicle according to a comparison result of the comparison unit when the authentication unit authenticates that the vehicle outside person is the registered user.

13 Claims, 6 Drawing Sheets

VEHICLE CONTROL SYSTEM AND CONTROL METHOD OF VEHICLE CONTROL SYSTEM

INCORPORATION BY REFERENCE

The present application claims priority under 35 U.S.C. § 119 to Japanese Patent Application No. 2022-057411 filed on Mar. 30, 2022. The content of the application is incorporated herein by reference in its entirety.

BACKGROUND OF THE INVENTION

Field of the Invention

The present invention relates to a control system and a control method of the control system.

Description of the Related Art

In recent years, active efforts have been made to provide sustainable access to a transportation system while taking into consideration even vulnerable people such as aged people and children among traffic participants. Towards the realization, the focus is on research and development for further improving traffic safety and convenience through development regarding accessibility of a vehicle. Up to now, technology regarding control of a door of a vehicle is known as the technology that improves the convenience (for example, see Japanese Patent Laid-Open No. 2013-28903). Japanese Patent Laid-Open No. 2013-28903 discloses the technology of detecting a motion of a human body present in a predetermined range of a vehicle in a noncontact manner, determining a moving operation of a vehicle door based on the detected motion of the human body and controlling door driving means according to the determination.

When a user of a vehicle will enter the vehicle, how the user approaches the vehicle (hereinafter, referred to as an "approach mode") is not always the same even for the same user. Therefore, in the control of a door of a vehicle, it is possible to improve convenience of the user of the vehicle if the approach mode of the user of the vehicle is taken into consideration. However, conventionally, in the control of the door of the vehicle, there has been no mechanism that takes into consideration the approach mode of the user and there has been room for improvement in terms of convenience improvement.

An object of the present invention, which has been made in consideration of circumstances described above, is to improve convenience of a user of a vehicle in the control of a door of the vehicle.

SUMMARY OF THE INVENTION

An aspect of the present invention is a control system which is a vehicle control system, including: a vehicle outside image acquisition unit configured to acquire a vehicle outside image which is an image outside the vehicle; a first detection unit configured to detect a vehicle outside person present outside the vehicle based on the vehicle outside image acquired by the vehicle outside image acquisition unit; a second detection unit configured to detect an approach mode for the vehicle outside person detected by the first detection unit, the approach mode representing how the person approaches the vehicle; a comparison unit configured to compare the approach mode detected by the second detection unit with a reference approach mode; an authentication unit configured to authenticate whether or not the vehicle outside person detected by the first detection unit is a registered user of the vehicle registered beforehand; and a door control unit configured to control a door of the vehicle according to a comparison result of the comparison unit when the authentication unit authenticates that the vehicle outside person is the registered user.

According to the aspect of the present invention, convenience of a user of a vehicle can be improved in the control of a door of the vehicle.

DETAILED DESCRIPTION OF THE PREFERRED EMBODIMENTS

Figure 1:
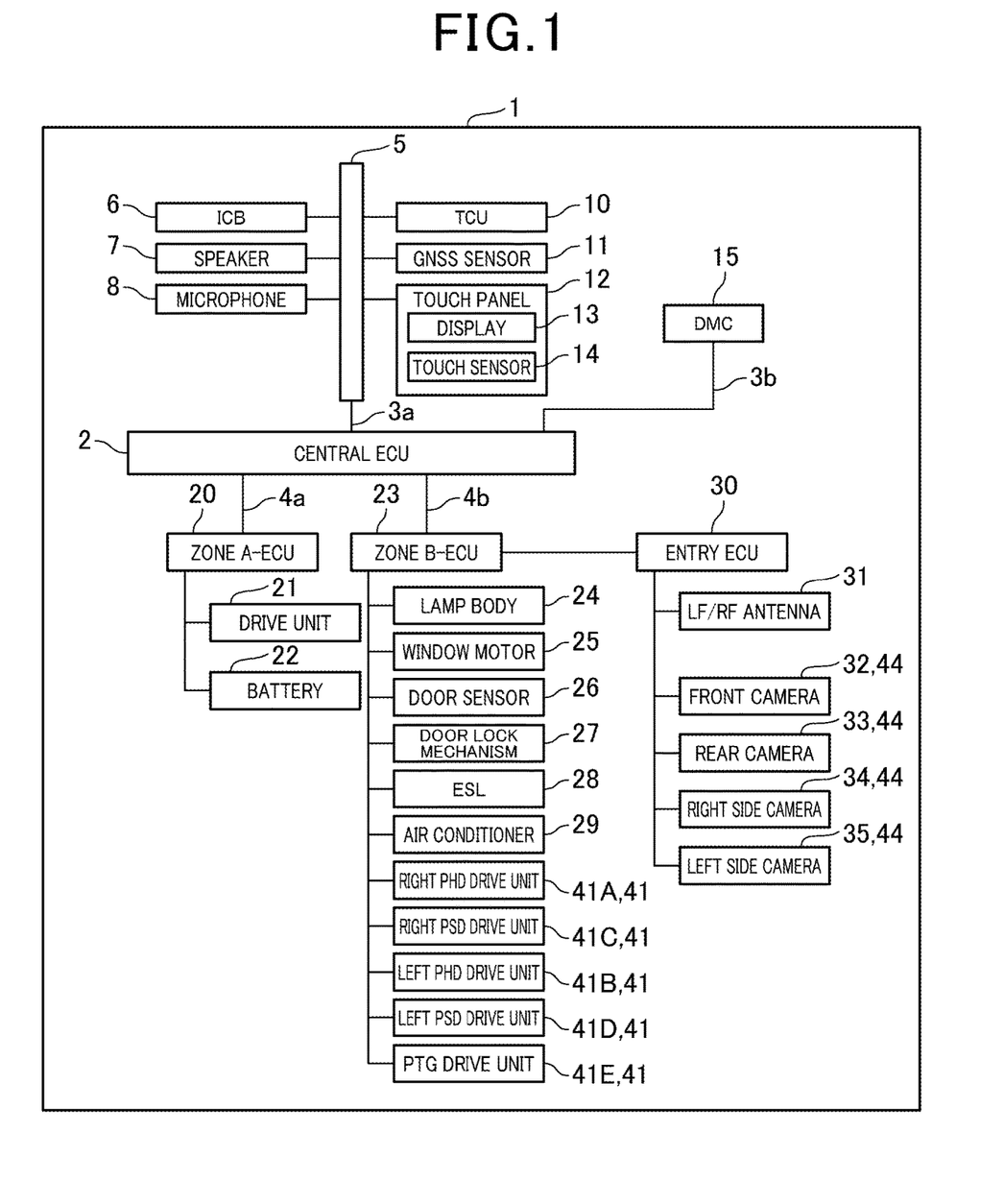
FIG. 1 is a diagram illustrating a configuration of a control system.

FIG. 1 is a diagram illustrating a control system 1 of a vehicle.

The control system 1 includes a central ECU 2 (processor, memory) which performs general control of the vehicle and information processing. The central ECU 2 is connected to communication lines including first communication lines 3a and 3b and second communication lines 4a and 4b. The central ECU 2 realizes a function of a gateway which manages transfer of communication data among the communication lines. In addition, the central ECU 2 executes OTA (Over The Air) management. The OTA management includes control regarding processing of downloading an update program of an in-vehicle device provided in the vehicle from a server outside the vehicle and processing of applying the downloaded update program to the in-vehicle device.

The first communication lines 3a and 3b and the second communication lines 4a and 4b are formed from buses for communication based on a standard of CAN, Ethernet (R) or the like, or the communication lines for P2P (Peer to Peer) communication. Note that the first communication lines 3a and 3b may be formed from the plurality of communication lines for the communication based on the same standard or may be formed from the plurality of communication lines for the communication based on the different standards. It is the same for the second communication lines 4a and 4b.

To the first communication line 3a, an ICB (Infotainment Control Box) 6, a speaker 7 and a microphone 8 are connected via an in-vehicle connection link 5.

In addition, to the in-vehicle connection link 5, a TCU (Telematics Control Unit) 10, a GNSS sensor (GNSS: Global Navigation Satellite System) 11 and a touch panel 12 are connected. The TCU 10 is a wireless communication device (transmitter/receiver, circuit) based on a communication standard of a mobile communication system. The touch panel 12 includes a display 13 and a touch sensor 14.

The ICB 6 is an IVI (In-Vehicle Infotainment)-ECU (processor, memory). The ICB 6 provides passengers of the vehicle with various kinds of information and entertainments using the speaker 7, the microphone 8, the GNSS sensor 11 and the touch panel 12 or the like.

The in-vehicle connection link 5 is formed from a plurality of communication transmission lines based on various communication standards. The in-vehicle connection link 5 may include a plurality of network transmission lines, for example. In this case, the plurality of network transmission lines may be connected to each other via a device having a gateway function or the like. In addition, the in-vehicle connection link 5 may include a transmission line for the P2P communication. For the network transmission lines, various kinds of communication buses for network communication based on various standards can be adopted. The standards of this kind are CAN, Ethernet, USB (Universal Serial Bus), LIN (Local Interconnect Network), and LVDS (Low Voltage Differential Signaling) for example, but may be other standards.

To the first communication line 3b, a DMC (Driver Monitoring Camera) 15 which monitors a driver is connected.

To the second communication line 4a, a zone A-ECU 20 (processor, memory) is connected. The zone A-ECU 20 is connected to a drive unit 21 and a battery 22. The drive unit 21 is, for example, a motor or an internal combustion engine which drives the vehicle.

To the second communication line 4b, a zone B-ECU 23 is connected. The zone B-ECU 23 is connected to a lamp body 24 and a window motor 25. The lamp body 24 includes, for example, a head lamp, a tail lamp and a direction indicator lamp or the like. The window motor 25 opens and closes vehicle windows. In addition, the zone B-ECU 23 is connected to a door sensor 26, a door lock mechanism 27, an ESL (Electronic Steering Lock) 28 and an air conditioner 29. The door sensor 26 detects an operation to a vehicle door. The door lock mechanism 27 locks and unlocks the vehicle door. To the zone B-ECU 23, an entry ECU 30 is connected. The entry ECU 30 is connected to an LF/RF antenna 31 for wireless communication with an electronic key of the present vehicle. The electronic key is an electronic device having a wireless communication function, and is referred to as a smart key or an FOB key. The entry ECU 30 cooperates with the other in-vehicle ECUs, processes user access from the outside of the vehicle to the control system 1, and realizes an operation of so-called smart entry.

To the entry ECU 30, a front camera 32, a rear camera 33, a right side camera 34 and a left side camera 35 are connected further. In addition, to the zone B-ECU 23, five drive units 41 that are a right PHD (Power Hinge Door) drive unit 41A, a right PSD (Power Slide Door) drive unit 41C, a left PHD drive unit 41B, a left PSD drive unit 41D and a PTG (Power Tail Gate) drive unit 41E are connected.

Hereinafter, a sign "V" is attached for the vehicle including the control system 1.

Figure 2:
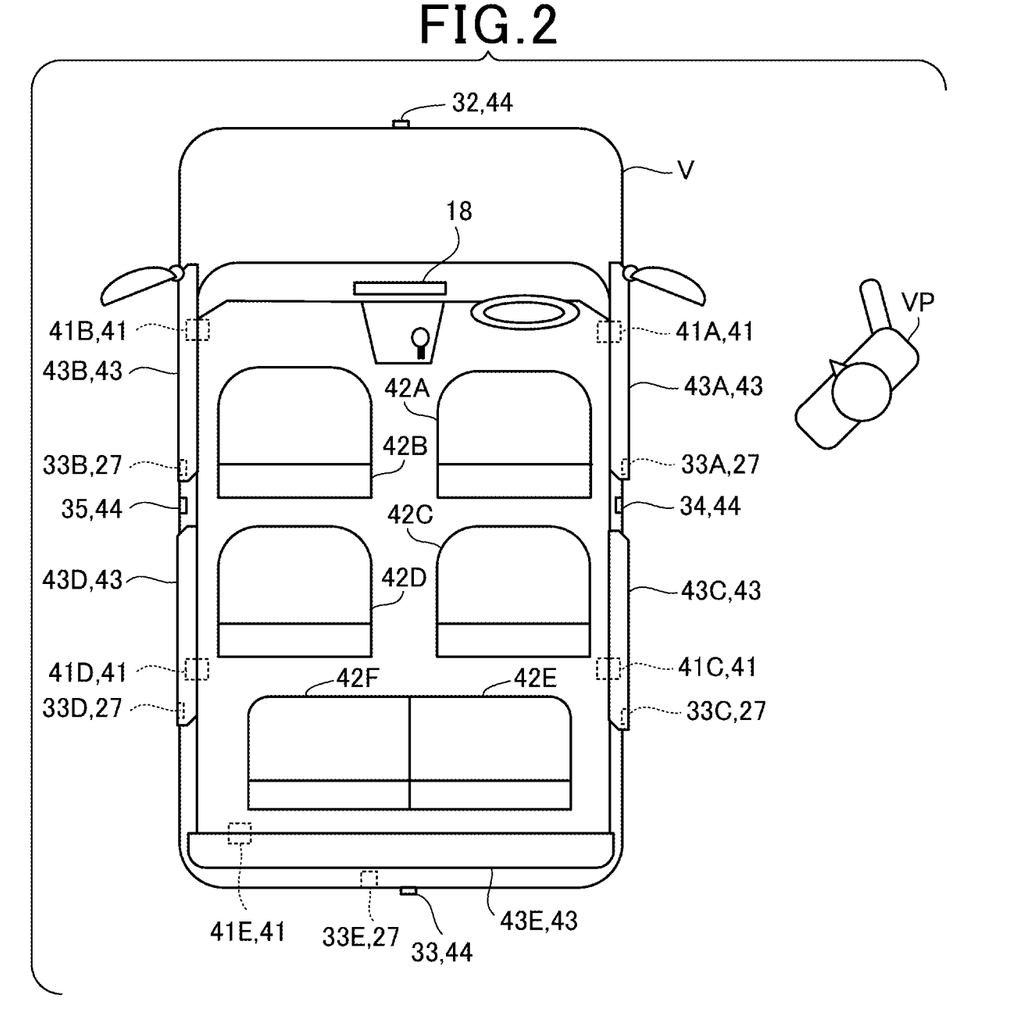
FIG. 2 is a diagram illustrating a configuration of a vehicle.

FIG. 2 is a diagram illustrating a configuration of a vehicle V.

As illustrated in FIG. 2, the vehicle V is a passenger car with a riding capacity of six, and includes a driver's seat 42A, a front passenger seat 42B, a second row right seat 42C, a second row left seat 42D, a third row right seat 42E and a third row left seat 42F.

The vehicle V includes five doors 43 that are a right power hinge door 43A, a left power hinge door 43B, a right power slide door 43C, a left power slide door 43D and a power tail gate 43E.

The right power hinge door 43A includes the right PHD drive unit 41A which drives the right power hinge door 43A to be open and closed by an electric actuator. The left power hinge door 43B includes the left PHD drive unit 41B which drives the left power hinge door 43B to be open and closed by the electric actuator. The right power slide door 43C includes the right PSD drive unit 41C which drives the right power slide door 43C to be open and closed by the electric actuator. The left power slide door 43D includes the left PSD drive unit 41D which drives the left power slide door 43D to be open and closed by the electric actuator. The power tail gate 43E includes the PTG drive unit 41E which drives the power tail gate 43E to be open and closed by the electric actuator.

The vehicle V includes the door lock mechanism 27. The door lock mechanism 27 includes door lock mechanisms 33A, 33B, 33C, 33D and 33E.

The door lock mechanism 33A locks and unlocks the right power hinge door 43A. The door lock mechanism 33B locks and unlocks the left power hinge door 43B. The door lock mechanism 33C locks and unlocks the right power slide door 43C. The door lock mechanism 33D locks and unlocks the left power slide door 43D. The door lock mechanism 33E locks and unlocks the power tail gate 43E.

The vehicle V includes four cameras 44 that are the front camera 32 which photographs the front of the vehicle V, the rear camera 33 which photographs the rear of the vehicle V, the right side camera 34 which photographs a right side of the vehicle V and the left side camera 35 which photographs a left side of the vehicle V. The cameras 44 are vehicle outside cameras which photograph the outside of the vehicle V. Therefore, moving images photographed by the cameras 44 include vehicle outside images which are the images outside the vehicle V.

The front camera 32 is provided on a front part of the vehicle V. The rear camera 33 is provided on a rear part of the vehicle V. The right side camera 34 is provided on a right side part of the vehicle V. The left side camera 35 is provided on a left side part of the vehicle V.

The cameras 44 correspond to a "vehicle outside image acquisition unit" of the present disclosure.

Figure 3:
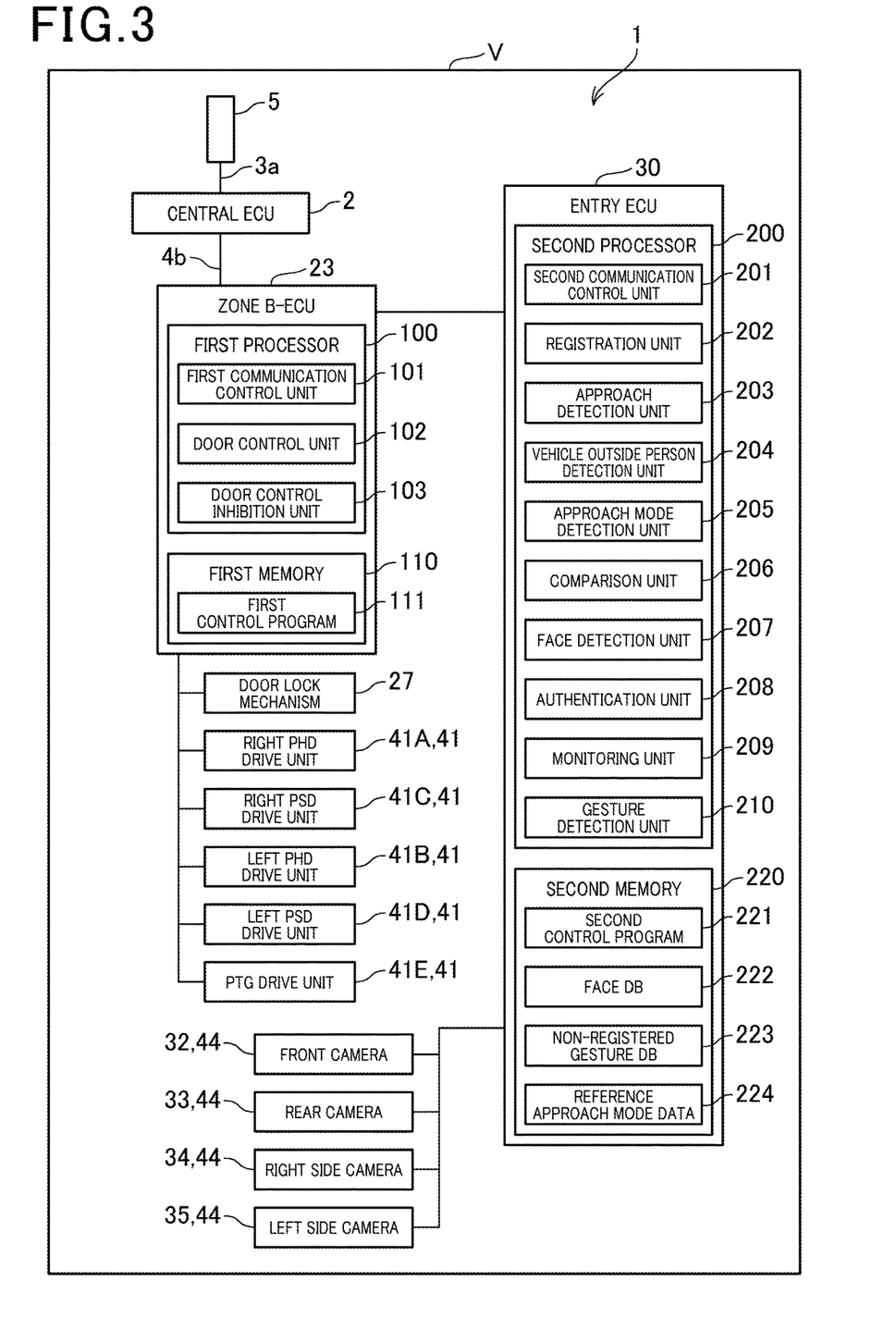
FIG. 3 is a diagram illustrating a main part configuration of the control system.

FIG. 3 is a diagram illustrating a main part configuration of the control system 1.

To the zone B-ECU 23, the central ECU 2 is connected via the second communication line 4b. In addition, to the zone B-ECU 23, the door lock mechanism 27, the right PHD drive unit 41A, the right PSD drive unit 41C, the left PHD drive unit 41B, the left PSD drive unit 41D and the PTG drive unit 41E are connected. Further, to the zone B-ECU 23, the entry ECU 30 is connected.

The zone B-ECU 23 includes a first processor 100 such as a CPU (Central Processing Unit) and an MPU (Micro Processor Unit), a first memory 110, and an interface circuit to which devices and apparatuses such as a sensor are connected.

The first memory 110 is a storage device which stores a program to be executed by the first processor 100 and data in a nonvolatile manner. The first memory 110 is formed from a magnetic storage device, a semiconductor storage element such as a flash ROM (Read Only Memory), or a nonvolatile storage device of the other kind. In addition, the first memory 110 may include a RAM (Random Access Memory) constituting a work area of the first processor 100.

Further, the first memory 110 may include a nonvolatile storage device such as an HDD (Hard Disk Drive) and an SSD (Solid State Drive). The first memory 110 stores the data to be processed by the first processor 100 and a first control program 111 to be executed by the first processor 100.

The first processor 100 functions as a first communication control unit 101, a door control unit 102 and a door control inhibition unit 103 by reading and executing the first control program 111 stored in the first memory 110.

The first communication control unit 101 receives various kinds of information from the entry ECU 30.

The door control unit 102 controls the door 43.

The door control unit 102 unlocks and locks the door 43. The door control unit 102 unlocks the door 43 by outputting an unlocking signal to the door lock mechanism 27. The door control unit 102 locks the door 43 by outputting a locking signal to the door lock mechanism 27. The door control unit 102 can specify the door 43 to be controlled and lock and unlock the specified door 43.

The door control unit 102 performs an opening operation of the door 43. The door control unit 102 controls the drive units 41 and performs the opening operation of the door 43 by outputting a control signal to the drive units 41. The door control unit 102 can specify the door 43 to be controlled and perform the opening operation of the specified door 43.

The door control unit 102 performs a closing operation of the door 43. The door control unit 102 controls the drive units 41 and performs the closing operation of the door 43 by outputting the control signal to the drive units 41. The door control unit 102 can specify the door 43 to be controlled and perform the closing operation of the specified door 43.

The door control inhibition unit 103 makes the door control unit 102 inhibit control of the door 43. In the present embodiment, inhibiting the control of the door 43 includes preventing execution of the control of the door 43, interrupting the control of the door 43 under execution, and interrupting the control of the door 43 under execution and returning the door 43 to a state before the execution. When the first communication control unit 101 receives inhibition request information, the door control inhibition unit 103 makes the door control unit 102 inhibit the control of the door 43. The door control inhibition unit 103 makes the door control unit 102 inhibit the control of the door 43 by outputting inhibition information to the door control unit 102. When a predetermined trigger such as unlocking of the door 43 by the electronic key is generated, the door control inhibition unit 103 cancels the inhibition of the control of the door 43. The door control inhibition unit 103 cancels the inhibition of the control of the door 43 by outputting cancellation information to the door control unit 102.

The entry ECU 30 includes a second processor 200 such as a CPU and an MPU, a second memory 220 and an interface circuit to which devices and apparatuses such as a sensor are connected. To the entry ECU 30, moving image data is inputted from the cameras 44. The moving image data is the data of moving images photographed by the cameras 44.

The second memory 220 is a storage device which stores a program to be executed by the second processor 200 and data in the nonvolatile manner. The second memory 220 is formed from a magnetic storage device, a semiconductor storage element such as a flash ROM, or a nonvolatile storage device of the other kind. In addition, the second memory 220 may include a RAM constituting a work area of the second processor 200. Further, the second memory 220 may include a nonvolatile storage device such as an HDD and an SSD. The second memory 220 stores the data to be processed by the second processor 200, a second control program 221 to be executed by the second processor 200, a face DB 222, a non-registered gesture DB 223 and a reference approach mode data 224 or the like.

In the face DB 222, information regarding a face is recorded for each user of the vehicle V. One record in the face DB 222 includes face feature amount data indicating a face feature amount. The face feature amount is a numerical value group for which a feature point is converted into a numerical value for each feature point of the face. Examples of the feature points are positions of eyes to a contour of the face, the position of a nose to the contour of the face and the position of a mouth to the contour of the face.

In the non-registered gesture DB 223, information relating to a non-registered gesture is recorded for each non-registered gesture. The non-registered gesture is a gesture not registered beforehand by the user of the vehicle V. One record that the non-registered gesture DB 223 has includes gesture contents information. The gesture contents information is information indicating gesture contents which are contents of the gesture.

The reference approach mode data 224 is data indicating an approach mode serving as a reference. In the present embodiment, as an approach mode, an approach speed which is a speed when approaching the vehicle V is exemplified. Therefore, the reference approach mode data 224 in the present embodiment is the data indicating a reference approach speed.

The second processor 200 functions as a second communication control unit 201, a registration unit 202, an approach detection unit 203, a vehicle outside person detection unit 204, an approach mode detection unit 205, a comparison unit 206, a face detection unit 207, an authentication unit 208, a monitoring unit 209 and a gesture detection unit 210 by reading and executing the second control program 221 stored in the second memory 220.

The vehicle outside person detection unit 204 corresponds to a "first detection unit" of the present disclosure. The approach mode detection unit 205 corresponds to a "second detection unit" of the present disclosure. The face detection unit 207 corresponds to a "fourth detection unit" of the present disclosure. The gesture detection unit 210 corresponds to a "third detection unit" of the present disclosure.

The second communication control unit 201 receives the moving image data from the zone B-ECU 23. The second communication control unit 201 outputs the received moving image data to individual functional units of the second processor 200.

The registration unit 202 records the face feature amount data of the user of the vehicle V in the face DB 222. The registration unit 202 generates the face feature amount data from the moving images photographed by the cameras 44 and records the face feature amount data in the face DB 222. Since the registration unit 202 records the face feature amount data in the face DB 222 in this way, the user of the vehicle V can register his/her own face to the vehicle V by making the cameras 44 photograph his/her own face.

The approach detection unit 203 detects approach of an object to the vehicle V. For example, the approach detection unit 203 detects the approach of an object to the vehicle V based on a detection value of a sonar sensor provided in the vehicle V. In addition, for example, the approach detection unit 203 detects the approach of an object to the vehicle V by detection of the electronic key using the LF/RF antenna 31. Note that a detection method of the approach detection unit 203 is just an example and is not limited to the examples described above. The cameras 44 of the present embodiment are activated and start photographing when the approach detection unit 203 detects the approach of an object to the vehicle V.

The vehicle outside person detection unit 204 detects a vehicle outside person VP present outside the vehicle V based on the vehicle outside image of the moving images indicated by the moving image data received by the second communication control unit 201. Specifically, the vehicle outside person detection unit 204 detects the vehicle outside person VP by detecting an image of the vehicle outside person VP from the vehicle outside image by a method of pattern matching or the like.

The approach mode detection unit 205 detects the approach mode of the vehicle outside person VP detected by the vehicle outside person detection unit 204 in a predetermined cycle. As described above, the approach speed is exemplified as the approach mode. Therefore, in the present embodiment, the approach mode detection unit 205 detects the approach speed of the vehicle outside person VP detected by the vehicle outside person detection unit 204. The approach mode detection unit 205 tracks the image of the vehicle outside person VP detected by the vehicle outside person detection unit 204 in the moving images photographed by the cameras 44. The approach mode detection unit 205 detects the approach speed based on an area change of the image of the vehicle outside person VP being tracked.

The comparison unit 206 compares the approach speed of the vehicle outside person VP detected by the approach mode detection unit 205 with the reference approach speed in the predetermined cycle. Specifically, the comparison unit 206 compares the approach speed of the vehicle outside person VP detected by the approach mode detection unit 205 with the approach speed indicated by the reference approach mode data 224. The comparison unit 206 outputs comparison result information indicating a comparison result to the second communication control unit 201 in the predetermined cycle. The second communication control unit 201 transmits the comparison result information received from the comparison unit 206 to the zone B-ECU 23.

The face detection unit 207 detects the face of the vehicle outside person VP detected by the vehicle outside person detection unit 204 in the predetermined cycle. The face detection unit 207 tracks the image of the vehicle outside person VP detected by the vehicle outside person detection unit 204 in the moving images photographed by the cameras 44. The face detection unit 207 detects the face of the vehicle outside person VP by detecting the image of the face by the method of pattern matching or the like from the image of the vehicle outside person VP being tracked.

The authentication unit 208 authenticates whether or not the vehicle outside person VP detected by the vehicle outside person detection unit 204 is a registered user. The authentication unit 208 authenticates whether or not the vehicle outside person VP is the registered user based on the face detected by the face detection unit 207. The registered user is a person registered to the vehicle V beforehand as the user of the vehicle V. The authentication unit 208 calculates the face feature amount from the image of the face detected by the face detection unit 207. The authentication unit 208 compares the calculated face feature amount with the face feature amount indicated by the face feature amount data recorded in the face DB 222, and determines whether or not the face feature amount data whose a concordance rate with the calculated face feature amount is at a threshold or higher is included in the face DB 222. When it is determined that the face feature amount data whose the concordance rate with the calculated face feature amount is at the threshold or higher is included in the face DB 222, the authentication unit 208 authenticates that the vehicle outside person VP detected by the vehicle outside person detection unit 204 is the registered user. On the other hand, when it is determined that the face feature amount data whose the concordance rate with the calculated face feature amount is at the threshold or higher is not included in the face DB 222, the authentication unit 208 authenticates that the vehicle outside person VP detected by the vehicle outside person detection unit 204 is not the registered user.

The monitoring unit 209 monitors a distance between the vehicle outside person VP authenticated as the registered user by the authentication unit 208 and the vehicle V. The monitoring unit 209 calculates the distance between the concerned vehicle outside person VP and the vehicle V in the predetermined cycle, and outputs distance information indicating the calculated distance to the second communication control unit 201. Note that the monitoring unit 209 tracks the image of the vehicle outside person VP authenticated as the registered user by the authentication unit 208 in the moving images photographed by the cameras 44, and calculates the distance between the vehicle outside person VP and the vehicle V based on a size or an area of the image being tracked. When the distance information is received from the monitoring unit 209, the second communication control unit 201 transmits the received distance information to the zone B-ECU 23.

The monitoring unit 209 monitors whether the vehicle outside person VP authenticated as the registered user by the authentication unit 208 has stopped while approaching the vehicle V and whether the vehicle outside person VP has moved away from the vehicle V while approaching the vehicle V. Note that stopping while approaching the vehicle V means that stopping occurs without reaching the vehicle V in the middle of approaching the vehicle V. Further, moving away from the vehicle V while approaching the vehicle V means that moving away from the vehicle V occurs without reaching the vehicle V in the middle of approaching the vehicle V.

The monitoring unit 209 tracks the image of the vehicle outside person VP authenticated as the registered user by the authentication unit 208 in the moving images photographed by the cameras 44. When the area of the image of the vehicle outside person VP being tracked does not change for a predetermined period within a predetermined range, the monitoring unit 209 determines that the vehicle outside person VP has stopped while approaching the vehicle V. When the area of the image of the vehicle outside person VP being tracked becomes small, the monitoring unit 209 determines that the vehicle outside person VP has moved away from the vehicle V while approaching the vehicle V. When it is determined that the vehicle outside person VP has stopped while approaching the vehicle V and when it is determined that the vehicle outside person VP has moved away from the vehicle V while approaching the vehicle V, the monitoring unit 209 outputs the inhibition request information to the second communication control unit 201. When the inhibition request information is received from the monitoring unit 209, the second communication control unit 201 transmits the received inhibition request information to the zone B-ECU 23.

The gesture detection unit 210 detects the non-registered gesture from the vehicle outside person VP authenticated as the registered user by the authentication unit 208. The gesture detection unit 210 tracks the image of the vehicle outside person VP authenticated as the registered user in the moving images photographed by the cameras 44. The gesture detection unit 210 performs image analysis on the image of the vehicle outside person VP being tracked, and extracts a characteristic (a motion vector, for example) of a motion of the vehicle outside person VP. Then, the gesture detection unit 210 recognizes motion contents of the vehicle outside person VP from the extracted characteristic of the motion of the vehicle outside person VP. Then, when the recognized motion contents of the vehicle outside person VP are the gesture contents recorded in the non-registered gesture DB 223, the gesture detection unit 210 determines that the non-registered gesture is detected.

Next, operations of the individual units of the control system 1 will be explained.

Figure 4:
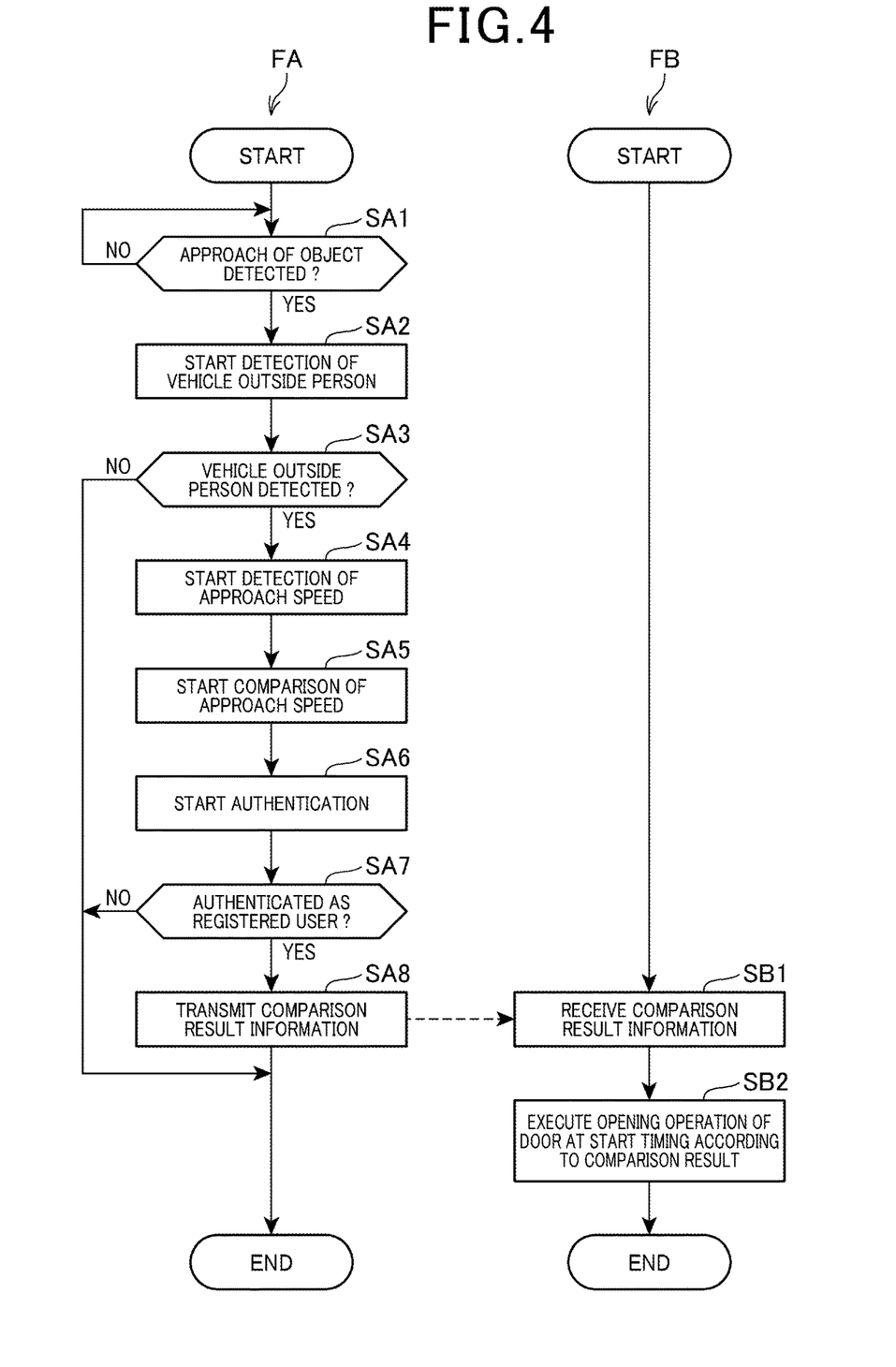
FIG. 4 is flowcharts illustrating operations of an entry ECU and a zone B-ECU.

FIG. 4 is flowcharts illustrating the operations of the entry ECU 30 and the zone B-ECU 23. In FIG. 4, a flowchart FA illustrates the operation of the entry ECU 30, and a flowchart FB illustrates the operation of the zone B-ECU 23.

As illustrated in the flowchart FA, the vehicle outside person detection unit 204 determines whether or not the approach detection unit 203 has detected the approach of an object (step SA1). When it is determined that the approach detection unit 203 has not detected the approach of an object (step SA1: NO), the vehicle outside person detection unit 204 performs determination in step SA1 again.

When it is determined that the approach detection unit 203 has detected the approach of an object (step SA1: YES), the vehicle outside person detection unit 204 starts the detection of the vehicle outside person VP (step SA2).

Then, the approach mode detection unit 205 determines whether or not the vehicle outside person detection unit 204 has detected the vehicle outside person VP (step SA3). When it is determined that the vehicle outside person VP has not been detected (step SA3: NO), the second processor 200 ends the present processing.

When it is determined that the vehicle outside person detection unit 204 has detected the vehicle outside person VP (step SA3: YES), the approach mode detection unit 205 starts the detection of the approach speed of the vehicle outside person VP detected by the vehicle outside person detection unit 204 (step SA4).

Next, the comparison unit 206 starts comparison between the approach speed detected by the approach mode detection unit 205 and the approach speed indicated by the reference approach mode data 224 (step SA5).

Then, the authentication unit 208 starts authentication of whether or not the vehicle outside person VP is the registered user (step SA6).

Next, the second communication control unit 201 determines whether or not the authentication unit 208 has authenticated that the vehicle outside person VP is the registered user (step SA7). When the second communication control unit 201 determines that it has been authenticated that the vehicle outside person VP is not the registered user (step SA7: NO), the second processor 200 ends the present processing.

On the other hand, when it is determined that it has been authenticated that the vehicle outside person VP is the registered user (step SA7: YES), the second communication control unit 201 transmits the comparison result information to the zone B-ECU 23 (step SA8). In step SA8, the second communication control unit 201 transmits the latest comparison result information of the comparison result information received from the comparison unit 206 to the zone B-ECU 23.

As illustrated in the flowchart FB, the first communication control unit 101 receives the comparison result information from the entry ECU 30 (step SB1).

Next, the door control unit 102 performs the opening operation of the door 43 at a start timing according to the comparison result indicated by the comparison result information received in step SB1 (step SB2).

Step SB2 will be explained in detail.

In a case where the comparison result indicates that the calculated approach speed and the approach speed of the reference approach mode data 224 are the same, the door control unit 102 starts the opening operation of the door 43 when the distance indicated by the distance information outputted by the monitoring unit 209 becomes a first distance. That is, in the case where the approach speed of the registered user is the same as the reference approach speed, the door control unit 102 starts the opening operation of the door 43 when the distance between the registered user and the vehicle V becomes the first distance.

In the case where the comparison result indicates that the calculated approach speed is lower than the approach speed of the reference approach mode data 224, the door control unit 102 starts the opening operation of the door 43 when the distance indicated by the distance information outputted by the monitoring unit 209 becomes a second distance shorter than the first distance. That is, in the case where the approach speed of the registered user is lower than the reference approach speed, the door control unit 102 starts the opening operation of the door 43 when the distance between the registered user and the vehicle V becomes the second distance.

In the case where the comparison result indicates that the calculated approach speed is higher than the approach speed of the reference approach mode data 224, the door control unit 102 starts the opening operation of the door 43 when the distance indicated by the distance information outputted by the monitoring unit 209 becomes a third distance longer than the first distance. That is, in the case where the approach speed of the registered user is higher than the reference approach speed, the door control unit 102 starts the opening operation of the door 43 when the distance between the registered user and the vehicle V becomes the third distance.

As above, in the case where the approach speed of the registered user is lower than the reference approach speed, the control system 1 delays the start timing and starts the opening operation of the door 43 so that the door 43 is prevented from being in an open state for an unnecessarily long period and security of the vehicle V can be improved. In addition, the door 43 can be turned to the open state at a timing appropriate for an arrival timing of the registered user at the vehicle V, and the control system 1 can realize smooth and seamless entry to the vehicle V.

Further, in the case where the approach speed of the registered user is higher than the reference approach speed, the control system 1 advances the start timing and starts the opening operation of the door 43 so that the smooth and seamless entry to the vehicle V can be realized in accordance with a situation where the registered user is in hurry when it is raining or the like for example.

In the present embodiment, when the registered user performs the non-registered gesture when approaching the vehicle V, the control system 1 performs the opening operation of the door 43 such that an opening degree of the door 43 becomes a predetermined opening degree (a half, for example).

(The Operation Relating to the Non-Registered Gesture)

When the authentication unit 208 authenticates that the vehicle outside person VP is the registered user, the gesture detection unit 210 of the entry ECU 30 starts the detection of the non-registered gesture from the vehicle outside person VP authenticated as the registered user by the authentication unit 208. When the non-registered gesture is not detected within a predetermined period after the detection of the non-registered gesture is started, the gesture detection unit 210 ends the detection of the non-registered gesture. On the other hand, when the non-registered gesture is detected, the gesture detection unit 210 outputs detection information indicating that the non-registered gesture is detected to the second communication control unit 201. The second communication control unit 201 transmits the received detection information to the zone B-ECU 23.

When the first communication control unit 101 receives the detection information, the door control unit 102 of the zone B-ECU 23 performs the opening operation of the door 43 such that the opening degree of the door 43 becomes the predetermined opening degree. When the opening degree of the door 43 is the predetermined opening degree or higher at the timing when the first communication control unit 101 receives the detection information, the door control unit 102 may perform the closing operation of the door 43 so as to turn the opening degree of the door 43 to the predetermined opening degree.

As above, when the non-registered gesture is detected from the registered user, the control system 1 performs the opening operation of the door 43 such that the opening degree of the door 43 becomes the predetermined opening degree. For example, when the non-registered gesture is skipping, the registered user can specify the opening degree of the door 43 to be the predetermined opening degree by skipping when approaching the vehicle V.

There are cases where the registered user stops while approaching the vehicle V or moves away from the vehicle V while approaching the vehicle V. Then, the control system 1 performs the operation relating to the cases after the authentication by the authentication unit 208.

(The Operation Relating to the Case of Stopping while Approaching)

The monitoring unit 209 of the entry ECU 30 determines whether or not the vehicle outside person VP authenticated as the registered user by the authentication unit 208 has stopped while approaching the vehicle V. When it is determined that the vehicle outside person VP has stopped while approaching the vehicle V, the monitoring unit 209 outputs the inhibition request information to the second communication control unit 201. Note that, when it is determined that the vehicle outside person VP has not stopped while approaching the vehicle V, the monitoring unit 209 does not output the inhibition request information to the second communication control unit 201. When the inhibition request information is received from the monitoring unit 209, the second communication control unit 201 transmits the received inhibition request information to the zone B-ECU 23.

When the first communication control unit 101 receives the inhibition request information, the door control inhibition unit 103 of the zone B-ECU 23 makes the door control unit 102 inhibit the control of the door 43. When it is before executing the control of the door 43, the door control unit 102 does not perform the control of the door 43, which has been scheduled to be executed. In the case where the control of the door 43 is being performed, the door control unit 102 interrupts the control of the door 43 or performs the operation of returning the state of the door 43 to the state before the control is started.

As above, when the registered user stops while approaching the vehicle V, the control system 1 inhibits the control of the door 43. When the registered user stops while approaching the vehicle V, it is possible that the registered user does not use the vehicle V after stopping. Therefore, the control system 1 can secure the security of the vehicle V by inhibiting the control of the door 43.

(The Operation Relating to the Case of Moving Away while Approaching)

The monitoring unit 209 of the entry ECU 30 determines whether or not the vehicle outside person VP authenticated as the registered user by the authentication unit 208 has moved away from the vehicle V while approaching the vehicle V. When it is determined that the vehicle outside person VP has moved away from the vehicle V while approaching the vehicle V, the monitoring unit 209 outputs locking request information to the second communication control unit 201. Note that, when it is determined that the vehicle outside person VP has not moved away from the vehicle V while approaching the vehicle V, the monitoring unit 209 does not output the locking request information to the second communication control unit 201. When the locking request information is received from the monitoring unit 209, the second communication control unit 201 transmits the received locking request information to the zone B-ECU 23.

When the first communication control unit 101 receives the locking request information, the door control unit 102 of the zone B-ECU 23 locks the door 43. In the case where the opening operation of the door 43 is being performed, the door control unit 102 interrupts the opening operation of the door 43, performs the closing operation of the door 43 and locks the door 43.

As above, the control system 1 locks the door 43 when the registered user moves away from the vehicle V while approaching the vehicle V so that the security of the vehicle V can be secured.

There is a case where the control system 1 cannot establish that the registered user is present around the vehicle V due to factors such as deviation of the registered user from an angle of view of the cameras 44. Then, the control system 1 performs the operation relating to the case after the authentication by the authentication unit 208.

(The Operation Relating to the Case of not being Able to Establish Presence of the Registered User)

The face detection unit 207 of the entry ECU 30 determines whether the face of the vehicle outside person VP authenticated as the registered user cannot be detected any more for a predetermined period after the vehicle outside person VP is authenticated as the registered user by the authentication unit 208. The predetermined period is set at a period from the time when the vehicle outside person VP is authenticated as the registered user to the entry to the vehicle V, and is determined by prior tests or simulations or the like. When it is determined that the face of the vehicle outside person VP authenticated as the registered user cannot be detected any more, the face detection unit 207 outputs the inhibition request information to the second communication control unit 201. When the inhibition request information is received from the face detection unit 207, the second communication control unit 201 transmits the received inhibition request information to the zone B-ECU 23.

When the first communication control unit 101 receives the inhibition request information, the door control inhibition unit 103 of the zone B-ECU 23 makes the door control unit 102 inhibit the control of the door 43. When it is before executing the control of the door 43, the door control unit 102 does not perform the control of the door 43, which has been scheduled to be executed. In the case where the control of the door 43 is being performed, the door control unit 102 interrupts the control of the door 43 or performs the operation of returning the state of the door 43 to the state before the control is started.

As above, when it cannot be established that the registered user is present around the vehicle V, the control system 1 inhibits the control of the door 43. Thus, the control system 1 can secure the security of the vehicle V.

A second embodiment will be explained.

For the configuration of the second embodiment, a same sign is attached to the configuration same as the first embodiment described above and detailed explanation is omitted.

Figure 5:
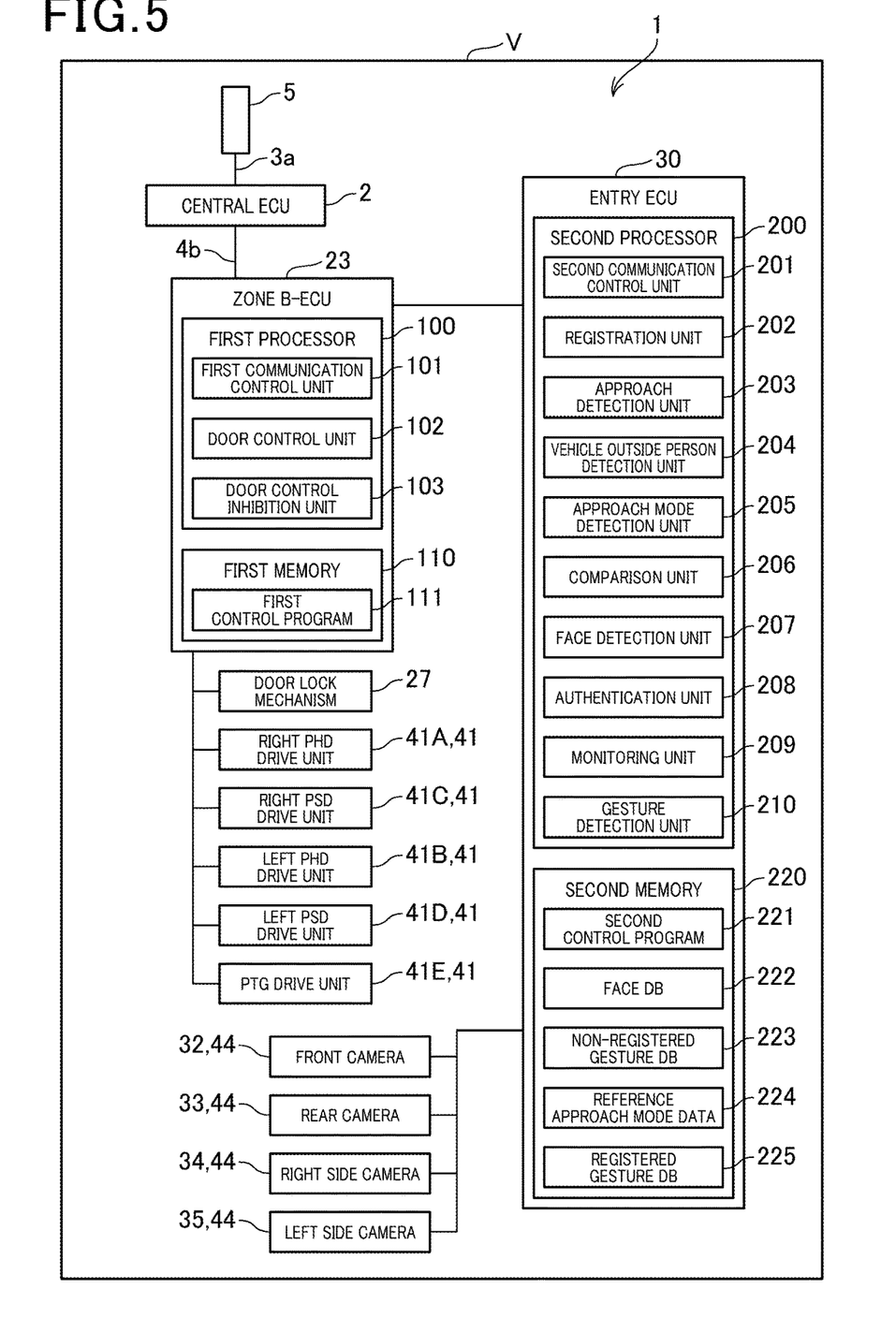
FIG. 5 is a diagram illustrating a main part configuration of the control system of a second embodiment.

FIG. 5 is a diagram illustrating the main part configuration of the control system 1 of the second embodiment.

As it is clear from the comparison between FIG. 5 and FIG. 2, the second memory 220 further stores a registered gesture DB 225.

In the registered gesture DB 225, information relating to a gesture is recorded for each registered gesture. The registered gesture is a gesture registered to the vehicle V beforehand by the user of the vehicle V. One record that the registered gesture DB 225 has includes gesture contents information and door control contents information. The door control contents information is the information indicating control contents of the door 43. For example, in the registered gesture DB 225, the gesture contents information indicating the gesture contents of "raising a left hand" and the door control contents information indicating the control contents of "opening a right power slide door" are associated.

The registration unit 202 of the second embodiment records a combination of the gesture contents of the registered gesture and the control contents of the door 43 in the registered gesture DB 225. The registration unit 202 of the second embodiment recognizes the gesture contents of the gesture performed by the user of the vehicle V from the moving images photographed by the cameras 44 by the method of image analysis or the like. Then, the registration unit 202 of the second embodiment associates the door control contents information indicating the control contents of the door 43 specified by the user of the vehicle V with the gesture contents information indicated by the recognized gesture contents and records the information in the registered gesture DB 225. The registration unit 202 of the second embodiment records the combination of the gesture contents and the control contents of the door 43 in the registered gesture DB 225 in this way so that the user of the vehicle V can register a desired gesture for having desired control be performed to the vehicle V.

The gesture detection unit 210 of the second embodiment detects the non-registered gesture similarly to the gesture detection unit 210 of the first embodiment. In addition, the gesture detection unit 210 of the second embodiment detects the registered gesture from the vehicle outside person VP detected by the vehicle outside person detection unit 204. The gesture detection unit 210 tracks the image of the vehicle outside person VP detected by the vehicle outside person detection unit 204 in the moving images photographed by the cameras 44. The gesture detection unit 210 performs the image analysis on the image of the vehicle outside person VP being tracked, and extracts the characteristic (the motion vector, for example) of the motion of the vehicle outside person VP. Then, the gesture detection unit 210 recognizes the motion contents of the vehicle outside person VP from the extracted characteristic of the motion of the vehicle outside person VP. Then, when the recognized motion contents of the vehicle outside person VP are the gesture contents recorded in the registered gesture DB 225, the gesture detection unit 210 determines that the registered gesture is detected.

Next, the operations of the individual units of the control system 1 in the second embodiment will be explained.

Figure 6:
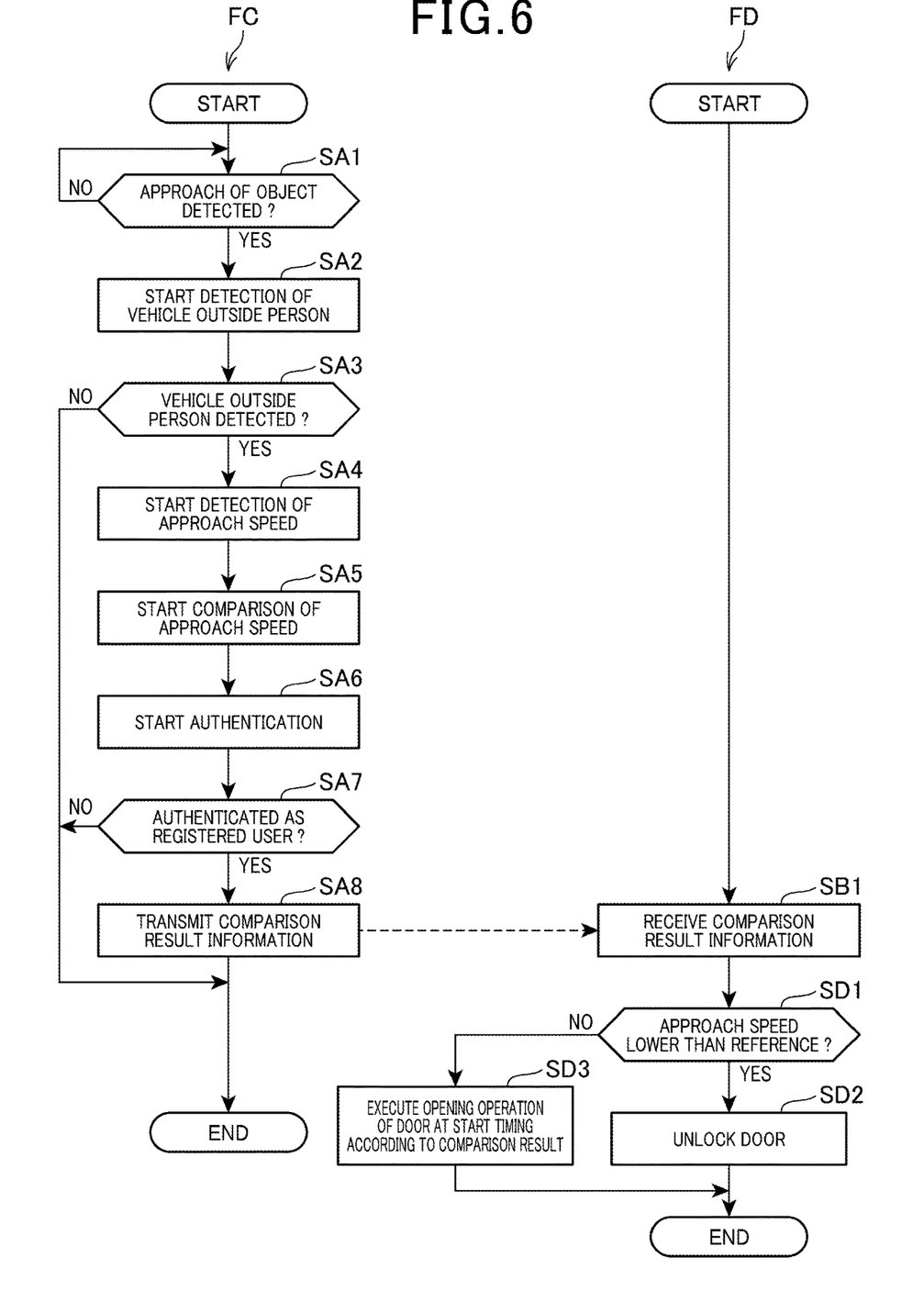
FIG. 6 is flowcharts illustrating the operations of the entry ECU and the zone B-ECU.

FIG. 6 is flowcharts illustrating the operations of the entry ECU 30 and the zone B-ECU 23. In FIG. 6, a flowchart FC illustrates the operation of the entry ECU 30, and a flowchart FD illustrates the operation of the zone B-ECU 23.

In the flowcharts in FIG. 6, a same step number is attached for a step same as FIG. 4 and the detailed explanation is omitted.

As illustrated in the flowchart FD, the door control unit 102 determines whether or not the comparison result indicated by the comparison result information received in step SB1 indicates that the calculated approach speed is lower than the approach speed of the reference approach mode data 224 (step SD1). That is, in step SD1, the door control unit 102 determines whether or not the approach speed of the registered user is lower than the reference approach speed.

When it is determined that the approach speed of the registered user is lower than the reference approach speed (step SD1: YES), the door control unit 102 unlocks the door 43 (step SD2).

On the other hand, when it is determined that the approach speed of the registered user is not lower than the reference approach speed (step SD1: NO), the door control unit 102 performs the opening operation of the door 43 at the start timing according to the comparison result indicated by the comparison result information received in step SB1 (step SD3).

Step SD3 will be explained in detail.

In the case where the comparison result indicates that the calculated approach speed and the approach speed of the reference approach mode data 224 are the same, the door control unit 102 starts the opening operation of the door 43 when the distance indicated by the distance information outputted by the monitoring unit 209 becomes the first distance. That is, in the case where the approach speed of the registered user is the same as the reference approach speed, the door control unit 102 starts the opening operation of the door 43 when the distance between the registered user and the vehicle V becomes the first distance.

In the case where the comparison result indicates that the calculated approach speed is higher than the speed of the reference approach mode data 224, the door control unit 102 starts the opening operation of the door 43 when the distance indicated by the distance information outputted by the monitoring unit 209 becomes the third distance longer than the first distance. That is, in the case where the approach speed of the registered user is higher than the reference approach speed, the door control unit 102 starts the opening operation of the door 43 when the distance between the registered user and the vehicle V becomes the third distance.

As above, in the case where the approach speed of the registered user is lower than the reference approach speed, the control system 1 unlocks the door 43 and does not perform the opening operation of the door 43. Thus, the door 43 can be turned to the open state at the timing intended by the registered user so that the control system 1 can secure the security of the vehicle V and can also improve the convenience of the user of the vehicle V.

In the case where the door 43 is unlocked only as the control of the door 43, the control system 1 of the present embodiment detects the registered gesture. That is, in the case where the approach speed of the registered user is lower than the reference, the control system 1 of the present embodiment detects the registered gesture. Hereinafter, this case will be explained.

(The Operation Relating to the Case of Only Unlocking the Door)

When the entry ECU 30 transmits the comparison result information indicating that the approach speed is lower than the reference approach mode data 224 to the zone B-ECU 23, the gesture detection unit 210 of the entry ECU 30 starts the detection of the registered gesture. When the registered gesture is not detected within a predetermined period after the detection of the registered gesture is started, the gesture detection unit 210 ends the detection of the registered gesture. When the registered gesture is detected, the gesture detection unit 210 acquires the door control contents information corresponding to the gesture contents of the detected registered gesture from the registered gesture DB 225. Then, the second communication control unit 201 transmits the door control contents information acquired by the gesture detection unit 210 to the zone B-ECU 23.

When the first communication control unit 101 receives the door control contents information, the door control unit 102 of the zone B-ECU 23 performs the opening operation of the door 43 according to the control contents indicated by the received door control contents information.

For example, in the registered gesture DB 225, it is assumed that the gesture contents information indicating the gesture contents of "raising a left hand" and the door control contents information indicating the control contents of "opening a right power slide door" are associated. In addition, it is assumed that at least the right power slide door 43C is unlocked when the gesture detection unit 210 starts the detection of the registered gesture. Further, it is assumed that the gesture detection unit 210 has detected the registered gesture of raising the left hand. In the case of this example, the door control unit 102 performs the opening operation of the right power slide door 43C.

(The Operation Relating to the Non-Registered Gesture)

In the present embodiment also, when the registered user performs the non-registered gesture when approaching the vehicle V, the control system 1 performs the opening operation of the door 43 such that the opening degree of the door 43 becomes the predetermined opening degree (a half, for example). The control system 1 of the present embodiment performs the operation similar to that of the control system 1 of the first embodiment, and when the non-registered gesture is detected, turns the opening degree of the door 43 to the predetermined degree.

(The Operation Relating to the Case of Stopping while Approaching)

In the present embodiment also, when the registered user stops while approaching the vehicle V, the control system 1 inhibits the control of the door 43. The control system 1 of the present embodiment performs the operation similar to that of the control system 1 of the first embodiment, and when the registered user stops while approaching the vehicle V, inhibits the control of the door 43.

(The Operation Relating to the Case of Moving Away while Approaching)

In the present embodiment also, when the registered user moves away from the vehicle V while approaching the vehicle V, the control system 1 locks the door 43. The control system 1 of the present embodiment performs the operation similar to that of the control system 1 of the first embodiment, and when the registered user moves away from the vehicle V while approaching the vehicle V, locks the door 43.

(The Operation Relating to the Case of not being Able to Establish the Presence of the Registered User)

In the present embodiment also, when the face of the vehicle outside person VP authenticated as the registered user cannot be detected any more, the control system 1 inhibits the control of the door 43. The control system 1 of the present embodiment performs the operation similar to that of the control system 1 of the first embodiment, and when the face of the vehicle outside person VP authenticated as the registered user cannot be detected any more, inhibits the control of the door 43.

In addition, in the present embodiment, when the face of the vehicle outside person VP authenticated as the registered user by the authentication unit 208 cannot be detected any more, the control system 1 discontinues the detection of the registered gesture. The discontinuation may be performed together with the inhibition of the control of the door 43, or instead of the inhibition of the control of the door 43.

The face detection unit 207 of the entry ECU 30 determines whether the face of the vehicle outside person VP authenticated as the registered user cannot be detected any more for the predetermined period after the vehicle outside person VP is authenticated as the registered user. When it is determined that the face of the vehicle outside person VP authenticated as the registered user cannot be detected any more, the face detection unit 207 outputs discontinuation request information to the gesture detection unit 210. When the discontinuation request information is received from the face detection unit 207, the gesture detection unit 210 discontinues the detection of the gesture.

Thus, since the control of the door 43 by the gesture is not performed when it cannot be established that the registered user is present around the vehicle V, the control system 1 can secure the security of the vehicle V.

The control system 1 of the present embodiment performs the control of the door 43 when the registered gesture is detected even when the registered user stops while approaching. Hereinafter, this will be explained.

(The Operation Relating the Case of Detecting the Registered Gesture after Stopping while Approaching)

When the registered gesture is detected after the door control inhibition unit 103 inhibits the control of the door 43, the gesture detection unit 210 of the entry ECU 30 acquires the door control contents information corresponding to the gesture contents of the detected registered gesture from the registered gesture DB 225. Then, the second communication control unit 201 transmits the door control contents information acquired by the gesture detection unit 210 to the zone B-ECU 23.

When the first communication control unit 101 receives the door control contents information, the door control inhibition unit 103 of the zone B-ECU 23 outputs the cancellation information to the door control unit 102. Then, the door control unit 102 performs the opening operation of the door 43 according to the control contents indicated by the received door control contents information.

The individual embodiments described above illustrate just one mode, and arbitrary modifications and applications are possible.

The first embodiment described above exemplifies the configuration of changing the start timing of performing the opening operation of the door 43 according to the comparison result, however, the configuration may be such that the operation speed of the opening operation of the door 43 is changed according to the comparison result. In the case of this configuration, when the comparison result indicates that the approach speed of the registered user is lower than the reference approach speed, the door control unit 102 makes the operation speed of the opening operation of the door 43 lower compared to the case where the approach speed of the registered user is at the reference approach speed or higher. In addition, in the case of the configuration, when the comparison result indicates that the approach speed of the registered user is higher than the reference approach speed, the door control unit 102 makes the operation speed of the opening operation of the door 43 higher compared to the case where the approach speed of the registered user is at the reference approach speed or lower. Note that, in the case of the configuration, the start timing of the opening operation is the same regardless of the comparison result.

While the opening operation of the door 43 is controlled according to the comparison result in the first embodiment described above, the configuration may be such that unlocking of the door 43 is controlled according to the comparison result. In the case of this configuration, when the comparison result indicates that the approach speed of the registered user is lower than the reference approach speed, the door control unit 102 delays the timing of unlocking the door 43 compared to the case when the approach speed of the registered user is at the reference approach speed or higher. In addition, in the case of the configuration, when the comparison result indicates that the approach speed of the registered user is higher than the reference approach speed, the timing of unlocking the door 43 is advanced compared to the case where the approach speed of the registered user is at the reference approach speed or lower.

While the opening operation of the door 43 is performed when the approach speed of the registered user is at the reference approach speed or higher in the second embodiment described above, the configuration may be such that the door 43 is unlocked. In the case of this configuration, when the comparison result indicates that the approach speed of the registered user is higher than the reference approach speed, the door control unit 102 advances the timing of unlocking the door 43 compared to the case where the approach speed of the registered user is at the reference approach speed or lower.

While the approach speed is exemplified as the approach mode in the individual embodiments described above, the approach mode is not limited to the approach speed, and may be a distance between the vehicle outside person VP and the vehicle V, for example.

The first processor 100 and the second processor 200 may be formed from a plurality of processors, or may be formed from a single processor. The processors may be hardware programmed to realize the functional units described above. In this case, the processors are formed from an ASIC (Application Specific Integrated Circuit) and an FPGA (Field Programmable Gate Array), for example.

In addition, the configuration of the individual units of the control system 1 illustrated in FIG. 1 is an example, and a specific mounting form is not limited in particular. That is, hardware individually corresponding to the individual units is not necessarily mounted, and it is of course possible to realize the functions of the individual units by one processor executing the program. Further, in the embodiments described above, some of the functions realized by software may be hardware, or some of the functions realized by hardware may be realized by software.

In addition, step units of the operations illustrated in FIG. 4 and FIG. 6 are divided according to main processing contents, and the present invention is not limited by a division method or names of processing units. Division into more step units may be performed according to the processing contents. Further, the division may be performed so that one step unit includes more processing. An order of the steps may be appropriately changed without obstructing the gist of the present invention.

Further, in the case of realizing a control method of the control system 1 described above using a processor, it is also possible to implement the program to be executed by the processor in the form of a recording medium or a transmission medium which transmits the program. That is, the first control program 111 can be realized in the state of recording the first control program 111 in a portable information recording medium. Examples of the information recording medium are a magnetic recording medium such as a hard disk, an optical recording medium such as a CD and a semiconductor storage device such as a USB (Universal Serial Bus) memory and an SSD (Solid State Drive), and the other recording medium can be also used. In addition, the second control program 221 can be realized in the state of recording the second control program 221 in a portable information recording medium, similarly to the first control program 111.

The embodiments described above support the following configurations.

(Configuration 1)

A control system which is a vehicle control system, including: a vehicle outside image acquisition unit configured to acquire a vehicle outside image which is an image outside the vehicle; a first detection unit configured to detect a vehicle outside person present outside the vehicle based on the vehicle outside image acquired by the vehicle outside image acquisition unit; a second detection unit configured to detect an approach mode for the vehicle outside person detected by the first detection unit, the approach mode representing how the person approaches the vehicle; a comparison unit configured to compare the approach mode detected by the second detection unit with a reference approach mode; an authentication unit configured to authenticate whether or not the vehicle outside person detected by the first detection unit is a registered user of the vehicle registered beforehand; and a door control unit configured to control a door of the vehicle according to a comparison result of the comparison unit when the authentication unit authenticates that the vehicle outside person is the registered user.

According to the control system of configuration 1, since the door of the vehicle can be controlled in consideration of the approach mode of the registered user, the convenience of the user of the vehicle can be improved in the control of the door of the vehicle.

(Configuration 2)

The control system according to configuration 1, wherein the second detection unit detects an approach speed to the vehicle as the approach mode, and the door control unit, when the comparison result indicates that the approach speed detected by the second detection unit is lower than the reference approach speed, delays a start timing of an opening operation of the door or an operation speed of the opening operation of the door compared to a case where the approach speed detected by the second detection unit is at the reference approach speed or higher, and performs the opening operation of the door.

According to the control system of configuration 2, the door of the vehicle can be unlocked or turned to the open state at the appropriate timing at which the registered user arrives at the vehicle. Thus, the smooth and seamless entry of the vehicle can be realized, and the convenience of the user of the vehicle can be improved more in the control of the door of the vehicle.

(Configuration 3)

The control system according to configuration 1 or configuration 2, wherein the second detection unit detects an approach speed to the vehicle as the approach mode, and the door control unit, when the comparison result indicates that the approach speed detected by the second detection unit is higher than the reference approach speed, advances a start timing of an opening operation of the door or an operation speed of the opening operation of the door compared to a case where the approach speed detected by the second detection unit is at the reference approach speed or lower, and performs the opening operation of the door.

According to the control system of configuration 3, the door of the vehicle can be unlocked or turned to the open state at the appropriate timing at which the registered user arrives at the vehicle. Thus, the smooth and seamless entry of the vehicle can be realized, and the convenience of the user of the vehicle can be improved more in the control of the door of the vehicle.

(Configuration 4)

The control system according to configuration 1, wherein the second detection unit detects an approach speed to the vehicle as the approach mode, and the door control unit unlocks the door but does not perform an opening operation of the door when the comparison result indicates that the approach speed detected by the second detection unit is lower than the reference approach speed.

According to the control system of configuration 4, since the door is unlocked but the opening operation of the door is not performed, the door can be turned to the open state at the timing intended by the user of the vehicle. Thus, the convenience of the user of the vehicle can be improved more in the control of the door of the vehicle.

(Configuration 5)

The control system according to configuration 4, including a third detection unit configured to detect a gesture of the vehicle outside person detected by the first detection unit, wherein the door control unit, when the third detection unit detects a registered gesture registered beforehand after the door is unlocked, performs the opening operation of the door based on the registered gesture detected by the third detection unit.

According to the control system of configuration 5, since the door can be turned to the open state by performing the registered gesture, the convenience of the user of the vehicle can be improved more in the control of the door of the vehicle.

(Configuration 6)

The control system according to configuration 5, including a fourth detection unit configured to detect a face of the vehicle outside person detected by the first detection unit, wherein the third detection unit discontinues detection of the gesture when the fourth detection unit cannot detect the face any more after detecting the face.

According to the control system of configuration 6, since the door can be prevented from being turned to the open state by the registered gesture when it cannot be established that the registered user is present around the vehicle, the security of the vehicle can be secured.

(Configuration 7)

The control system according to any one of configuration 1-configuration 6, including a third detection unit configured to detect a gesture of the vehicle outside person detected by the first detection unit, wherein the door control unit performs an opening operation of the door to be open to a predetermined angle when the third detection unit detects a non-registered gesture not registered beforehand.

According to the control system of configuration 7, since the opening degree of the door can be specified to be the predetermined opening angle by performing the non-registered gesture without performing registration work, the convenience of the user of the vehicle can be improved more in the control of the door of the vehicle.

(Configuration 8)

The control system according to any one of configuration 1-configuration 7, including a door control inhibition unit configured to make the door control unit inhibit control of the door when the vehicle outside person authenticated as the registered user by the authentication unit stops while approaching the vehicle.

When the registered user stops while approaching, it is possible that the registered user is not using the vehicle, however, according to the control system of configuration 8, the security of the vehicle can be secured even in such a case.

(Configuration 9)

The control system according to configuration 5 or configuration 6, including a door control inhibition unit configured to make the door control unit inhibit control of the door when the vehicle outside person authenticated as the registered user by the authentication unit stops while approaching the vehicle, wherein the door control inhibition unit cancels inhibition of the control of the door when the third detection unit detects the registered gesture registered beforehand after the control of the door is inhibited, and the door control unit controls the door based on the registered gesture detected by the third detection unit after the inhibition of the control of the door is canceled.

According to the control system of configuration 9, even when the registered user stops, in the case where the registered gesture is detected, the door is controlled based on the detected registered gesture so that the user other than the registered user can make the control of the door be performed by the registered gesture. Thus, the convenience of the user of the vehicle can be improved in the control of the door of the vehicle.

(Configuration 10)

The control system according to any one of configuration 1-configuration 9, wherein the door control unit locks the door when the vehicle outside person authenticated as the registered user by the authentication unit moves away from the vehicle while approaching the vehicle.

According to the control system of configuration 10, since the door is locked when the registered user moves away from the vehicle while approaching the vehicle, the security of the vehicle can be secured.

(Configuration 11)

The control system according to any one of configuration 1-configuration 10, including: a fourth detection unit configured to detect a face of the vehicle outside person detected by the first detection unit; and a door control inhibition unit configured to make the door control unit inhibit control of the door when the fourth detection unit cannot detect the face any more after detecting the face.

According to the control system of configuration 11, since the control of the door is inhibited when it cannot be established that the registered user is present around the vehicle, the security of the vehicle can be secured.

(Configuration 12)

A control method which is a control method of a vehicle control system, including: acquiring a vehicle outside image which is an image outside the vehicle; detecting a vehicle outside person present outside the vehicle based on the acquired vehicle outside image; detecting an approach mode for the detected vehicle outside person, the approach mode representing how the person approaches the vehicle; comparing the detected approach mode with a reference approach mode; authenticating whether or not the detected vehicle outside person is a registered user who is a user of the vehicle registered beforehand; and controlling a door of the vehicle according to a comparison result when the vehicle outside person is authenticated as the registered user.

According to the control method of the control system of configuration 12, effects similar to that of the control system of configuration 1 are accomplished.

1 . . . control system, 2 . . . central ECU, 3a . . . first communication line, 4b . . . second communication line, 5 . . . in-vehicle connection link, 27 . . . door lock mechanism, 23 . . . zone B-ECU, 33A-33E . . . door lock mechanism, 30 . . . entry ECU, 32 . . . front camera, 33 . . . rear camera, 34 . . . right side camera, 35 . . . left side camera, 41 . . . drive unit, 41A . . . right PHD drive unit, 41B . . . left PHD drive unit, 41C . . . right PSD drive unit, 41D . . . left PSD drive unit, 41E . . . PTG drive unit, 43 . . . door, 43A . . . right power hinge door, 43B . . . left power hinge door, 43C . . . right power slide door, 43D . . . left power slide door, 43E . . . power tail gate, 44 . . . camera (vehicle outside image acquisition unit), 100 . . . first processor, 101 . . . first communication control unit, 102 . . . door control unit, 103 . . . door control inhibition unit, 110 . . . first memory, 111 . . . first control program, 200 . . . second processor, 201 . . . second communication control unit, 202 . . . registration unit, 203 . . . approach detection unit, 204 . . . vehicle outside person detection unit (first detection unit), 205 . . . approach mode detection unit (second detection unit), 206 . . . comparison unit, 207 . . . face detection unit (fourth detection unit), 208 . . . authentication unit, 209 . . . monitoring unit, 210 . . . gesture detection unit (third detection unit), 220 . . . second memory, 221 . . . second control program, 222 . . . face DB, 224 . . . reference approach mode data, 223 . . . non-registered gesture DB, V . . . vehicle, VP . . . vehicle outside person.

What is claimed is:

1. A vehicle control system, comprising:
a vehicle outside image acquisition unit comprising cameras configured to acquire a vehicle outside image which is an image outside the vehicle; and
at least one processor configured to function as:
  a first detection unit configured to detect a vehicle outside person present outside the vehicle based on the vehicle outside image acquired by the vehicle outside image acquisition unit;
  a second detection unit configured to detect an approach mode for the vehicle outside person detected by the first detection unit, the approach mode representing how the person approaches the vehicle;
  a comparison unit configured to compare the approach mode detected by the second detection unit with a reference approach mode;
  an authentication unit configured to authenticate whether or not the vehicle outside person detected by the first detection unit is a registered user of the vehicle registered beforehand; and
  a door control unit configured to control a door of the vehicle, by outputting a signal to a door lock mechanism and a drive unit, according to a comparison result of the comparison unit when the authentication unit authenticates that the vehicle outside person is the registered user,
wherein the second detection unit detects an approach speed to the vehicle as the approach mode, and
the door control unit, when the comparison result indicates that the approach speed detected by the second detection unit is higher than a reference approach speed as the reference approach mode, advances a start timing of an opening operation of the door or an operation speed of the opening operation of the door compared to a case where the approach speed detected by the second detection unit is at the reference approach speed or lower, and performs the opening operation of the door.

2. A vehicle control system, comprising:
a vehicle outside image acquisition unit comprising cameras configured to acquire a vehicle outside image which is an image outside the vehicle; and
at least one processor configured to function as:
  a first detection unit configured to detect a vehicle outside person present outside the vehicle based on the vehicle outside image acquired by the vehicle outside image acquisition unit;
  a second detection unit configured to detect an approach mode for the vehicle outside person detected by the first detection unit, the approach mode representing how the person approaches the vehicle;
  a comparison unit configured to compare the approach mode detected by the second detection unit with a reference approach mode;
  an authentication unit configured to authenticate whether or not the vehicle outside person detected by the first detection unit is a registered user of the vehicle registered beforehand; and
  a door control unit configured to control a door of the vehicle, by outputting a signal to a door lock mechanism and a drive unit, according to a comparison result of the comparison unit when the authentication unit authenticates that the vehicle outside person is the registered user,
wherein the second detection unit detects an approach speed to the vehicle as the approach mode, and
the door control unit unlocks the door but does not perform an opening operation of the door when the comparison result indicates that the approach speed detected by the second detection unit is lower than a reference approach speed as the reference approach mode.

3. The vehicle control system according to claim 2, comprising
a third detection unit configured to detect a gesture of the vehicle outside person detected by the first detection unit,
wherein the door control unit, when the third detection unit detects a registered gesture registered beforehand after the door is unlocked, performs the opening operation of the door based on the registered gesture detected by the third detection unit.

4. The vehicle control system according to claim 3, wherein
the at least one processor is further configured to function as a fourth detection unit configured to detect a face of the vehicle outside person detected by the first detection unit, and
the third detection unit discontinues detection of the gesture when the fourth detection unit cannot detect the face any more after detecting the face.

5. A vehicle control system, comprising:
a vehicle outside image acquisition unit comprising cameras configured to acquire a vehicle outside image which is an image outside the vehicle; and
at least one processor configured to function as:
a first detection unit configured to detect a vehicle outside person present outside the vehicle based on the vehicle outside image acquired by the vehicle outside image acquisition unit;
a second detection unit configured to detect an approach mode for the vehicle outside person detected by the first detection unit, the approach mode representing how the person approaches the vehicle;
a comparison unit configured to compare the approach mode detected by the second detection unit with a reference approach mode;
an authentication unit configured to authenticate whether or not the vehicle outside person detected by the first detection unit is a registered user of the vehicle registered beforehand;
a door control unit configured to control a door of the vehicle, by outputting a signal to a door lock mechanism and a drive unit, according to a comparison result of the comparison unit when the authentication unit authenticates that the vehicle outside person is the registered user; and
a third detection unit configured to detect a gesture of the vehicle outside person detected by the first detection unit,
wherein the door control unit performs an opening operation of the door to be open to a predetermined angle when the third detection unit detects a non-registered gesture not registered beforehand.

6. A vehicle control system, comprising:
a vehicle outside image acquisition unit comprising cameras configured to acquire a vehicle outside image which is an image outside the vehicle; and
at least one processor configured to function as:
a first detection unit configured to detect a vehicle outside person present outside the vehicle based on the vehicle outside image acquired by the vehicle outside image acquisition unit;
a second detection unit configured to detect an approach mode for the vehicle outside person detected by the first detection unit, the approach mode representing how the person approaches the vehicle;
a comparison unit configured to compare the approach mode detected by the second detection unit with a reference approach mode;
an authentication unit configured to authenticate whether or not the vehicle outside person detected by the first detection unit is a registered user of the vehicle registered beforehand;
a door control unit configured to control a door of the vehicle, by outputting a signal to a door lock mechanism and a drive unit, according to a comparison result of the comparison unit when the authentication unit authenticates that the vehicle outside person is the registered user; and
a door control inhibition unit configured to make the door control unit inhibit control of the door when the vehicle outside person authenticated as the registered user by the authentication unit stops while approaching the vehicle.

7. The vehicle control system according to claim 3, wherein
the at least one processor is further configured to function as a door control inhibition unit configured to make the door control unit inhibit control of the door when the vehicle outside person authenticated as the registered user by the authentication unit stops while approaching the vehicle,
the door control inhibition unit cancels inhibition of the control of the door when the third detection unit detects the registered gesture registered beforehand after the control of the door is inhibited, and
the door control unit controls the door based on the registered gesture detected by the third detection unit after the inhibition of the control of the door is canceled.

8. The vehicle control system according to claim 1, wherein the door control unit locks the door when the vehicle outside person authenticated as the registered user by the authentication unit moves away from the vehicle while approaching the vehicle.

9. The control system according to claim 1, the at least one processor is further configured to function as:
a fourth detection unit configured to detect a face of the vehicle outside person detected by the first detection unit; and
a door control inhibition unit configured to make the door control unit inhibit control of the door when the fourth detection unit cannot detect the face any more after detecting the face.

10. A control method which is a control method of a vehicle control system, comprising:
acquiring a vehicle outside image which is an image outside the vehicle;
detecting a vehicle outside person present outside the vehicle based on the acquired vehicle outside image;
detecting an approach mode for the detected vehicle outside person, the approach mode representing how the person approaches the vehicle, an approach speed to the vehicle being detected as the approach mode;
comparing the detected approach mode with a reference approach mode;
authenticating whether or not the detected vehicle outside person is a registered user who is a user of the vehicle registered beforehand; and
controlling a door of the vehicle according to a comparison result when the vehicle outside person is authenticated as the registered user, wherein controlling the door of the vehicle includes, when the comparison result indicates that the approach speed detected as the approach mode is higher than a reference approach speed as the reference approach mode, advancing a start timing of an opening operation of the door or an operation speed of the opening operation of the door compared to a case where the approach speed detected by the second detection unit is at the reference approach speed or lower, and performing the opening operation of the door.

11. A control method which is a control method of a vehicle control system, comprising:
- acquiring a vehicle outside image which is an image outside the vehicle;
- detecting a vehicle outside person present outside the vehicle based on the acquired vehicle outside image;
- detecting an approach mode for the detected vehicle outside person, the approach mode representing how the person approaches the vehicle, an approach speed to the vehicle being detected as the approach mode;
- comparing the detected approach mode with a reference approach mode;
- authenticating whether or not the detected vehicle outside person is a registered user who is a user of the vehicle registered beforehand; and
- controlling a door of the vehicle according to a comparison result when the vehicle outside person is authenticated as the registered user, wherein controlling the door of the vehicle includes unlocking the door but not performing an opening operation of the door when the comparison result indicates that the approach speed detected by the second detection unit is lower than a reference approach speed as the reference approach mode.

12. A control method which is a control method of a vehicle control system, comprising:
- acquiring a vehicle outside image which is an image outside the vehicle;
- detecting a vehicle outside person present outside the vehicle based on the acquired vehicle outside image;
- detecting an approach mode for the detected vehicle outside person, the approach mode representing how the person approaches the vehicle;
- detecting a gesture of the detected vehicle outside person;
- comparing the detected approach mode with a reference approach mode;
- authenticating whether or not the detected vehicle outside person is a registered user who is a user of the vehicle registered beforehand; and
- controlling a door of the vehicle according to a comparison result when the vehicle outside person is authenticated as the registered user, wherein controlling the door of the vehicle includes performing an opening operation of the door to be open to a predetermined angle when a non-registered gesture not registered beforehand is detected.

13. A control method which is a control method of a vehicle control system, comprising:
- acquiring a vehicle outside image which is an image outside the vehicle;
- detecting a vehicle outside person present outside the vehicle based on the acquired vehicle outside image;
- detecting an approach mode for the detected vehicle outside person, the approach mode representing how the person approaches the vehicle;
- detecting a gesture of the detected vehicle outside person;
- comparing the detected approach mode with a reference approach mode;
- authenticating whether or not the detected vehicle outside person is a registered user who is a user of the vehicle registered beforehand;
- controlling a door of the vehicle according to a comparison result when the vehicle outside person is authenticated as the registered user; and
- inhibiting control of the door when the vehicle outside person authenticated as the registered user by the authentication unit stops while approaching the vehicle.

* * * * *